United States Patent [19]

Miyajima

[11] Patent Number: 5,299,477
[45] Date of Patent: Apr. 5, 1994

[54] METHOD OF SELECTING A TOOL IN A PUNCHING PRESS MACHINE

[75] Inventor: Keiichiro Miyajima, Yamanashi, Japan

[73] Assignee: Fanuc Ltd, Minamitsuru, Japan

[21] Appl. No.: 842,333

[22] PCT Filed: Jul. 24, 1991

[86] PCT No.: PCT/JP91/00994
§ 371 Date: Mar. 26, 1992
§ 102(e) Date: Mar. 26, 1992

[87] PCT Pub. No.: WO92/01522
PCT Pub. Date: Feb. 6, 1992

[30] Foreign Application Priority Data

Jul. 26, 1990 [JP] Japan .................... 2-198142

[51] Int. Cl.⁵ .............................. B21D 28/02
[52] U.S. Cl. ........................... 83/13; 83/76.7; 83/552; 483/28; 483/5
[58] Field of Search .............. 83/76.7, 549, 550, 551, 83/552, 563; 72/442, 446; 483/1, 5, 6, 28, 29

[56] References Cited

U.S. PATENT DOCUMENTS

| | | | |
|---|---|---|---|
| 4,555,966 | 12/1985 | Klingel | 83/549 X |
| 5,048,385 | 9/1991 | Eckert et al. | 83/552 X |
| 5,062,337 | 11/1991 | Johnson et al. | 83/552 |
| 5,076,127 | 12/1991 | Otto et al. | 83/552 |

FOREIGN PATENT DOCUMENTS 62-252620 11/1987 Japan .
63-188481 8/1988 Japan .

Primary Examiner—Z. R. Bilinsky
Attorney, Agent, or Firm—Staas & Halsey

[57] ABSTRACT

In a method of tool selection control for a punching press machine equipped with a multi-tool holder, a tool selection instruction (1) consisting of 4-digit T codes such as (T1101) associated with a first punch tool (42a) of the multi-holder (42) is read from a machining program. A holder designation code (T11XX) for designating the multi-tool holder is provided to a magazine (4), based on the upper two digits of the T code, and is converted to a target rotation position of the magazine by a first angle parameter (2). A tool designation code (TXX01) for designating a first punch tool fitted to the designated multi-tool holder, which consists of the lower two bits of the T code, is converted to a target rotation position of the designated multi-tool holder by a second angle parameter (3). The magazine and each of the designated multi-tool holders are rotated round their axes of rotation (T axis or C axis) and are positioned to their target rotation positions, so that the designated punch tool of the designated multi-tool holder is selected.

5 Claims, 2 Drawing Sheets

METHOD OF SELECTING A TOOL IN A PUNCHING PRESS MACHINE

BACKGROUND OF THE INVENTION

1. Field of the Invention

The present invention relates to a method of selecting a tool in a punching press machine, and in particular to a method of selecting a tool in a punching press machine which is provided with a multi-tool holder including a plurality of punch tools.

2. Description of the Related Art

Conventional punching press machines are equipped with a magazine having a plurality of tool holders in which one punch tool is changeably mounted, so the punching press machines machine a workpiece by means of a punch tool which is selected from a plurality of punch tools according to indexing of the magazine and change the punch tool as occasion demands. When producing various products of a small amount, changing of the punch tools are frequently carried out, whereby productive efficiency lowers.

So, a multi-tool holder mounting a plurality of punch tools may be utilized. In a case of selecting a desired punch tool in this type of punching press machine, it is required to index the multi-tool holder as well as index the magazine. For this reason, conventionally, the amount of rotation of the magazine and multi-tool holder must be individually designated in machining programs. However, it is very troublesome to designate respective amounts of rotation of the magazine and the multi-tool holder each time when a selected punch tool is designated for selection, and it requires excess labor to make machining programs.

SUMMARY OF THE INVENTION

An object of the present invention is to provide a method of selecting a tool in a punching press machine equipped with a multi-tool holder, which is capable of easily designating a punch tool for selection.

In order to achieve the above-mentioned object, the present invention provides a method of selecting a tool in a punching press machine equipped with a plurality of tool holders including at least one multi-tool holder in which a plurality of punch tools are mounted. The method of selecting a tool comprises the steps of reading machining programs which include tool selection commands consisting of a holder designation code for designating any one of a plurality of tool holders and a tool designation code for designating at least any one of a plurality of punch tools mounted in the designated tool holder, and carrying out indexing of the magazine and the tool holder relating to the read tool selection command in accordance with the holder and tool designation codes constituting the tool selection command every time when a tool selection command is read from the machining programs.

As described above, according to the present invention, when the punching press machine is operated in accordance with the machining programs including the tool selection commands consisting of the holder designation code for designating any one of plurality of tool holders which are mounted to the punching press machine and contain a multi-tool holder having a plurality of punch tools, and the tool designation code for designating any one of a plurality of punch tools mounted in the designated tool holder, indexing of the magazine and the tool holder is then carried out in accordance with the holder and tool designation codes constituting the tool selection command which is read from the machining programs, whereby, a desired punch tool can be accurately selected from a plurality of punch tools mounted in the punching press machine. And further, unlike the conventional method which designates respective amount of rotation of the magazine and the tool holder in order to select the desired punch tool, according to the present invention, if only tool selection commands consisting of the holder and tool designation codes are entered in the machining programs, the desired punch tool can be simply selected, whereby it is possible to easily make the machining programs.

DESCRIPTION OF THE PREFERRED EMBODIMENT

Figure 1:
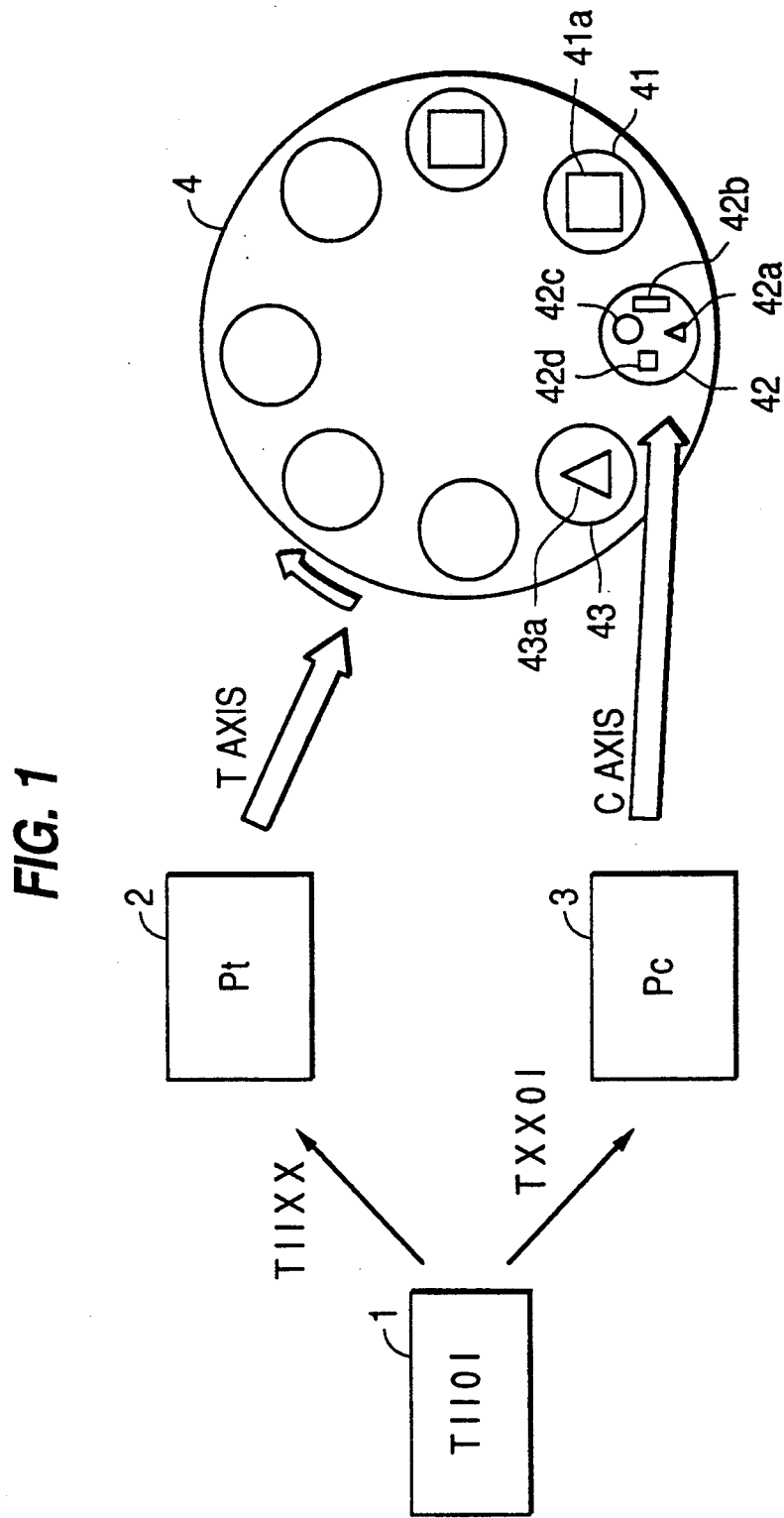
FIG. 1 is a schematic diagram illustrating an operational principle of a method of selecting a tool according to an embodiment of the present invention.

As shown in FIG. 1, a punching press machine utilizing a method of selecting a tool according to an embodiment of the present invention includes a magazine 4 having a plurality of tool holders 41, 42, 43, ..., and the magazine 4 is rotatably arranged around its spindle (T axis). At least one of the plurality of tool holders comprises a multi-tool holder on which a plurality of punching tools are changeably mounted, and each of multi-tool holders is rotatably mounted around its spindle (C axis). For example, four punch tools 42a through 42d are mounted in the multi-tool holder 42. Further, one punching tool is changeably mounted in each of ordinary tool holders except the multi-tool holder. For example, punch tools 41a and 43a are mounted in tool holders 41 and 43, respectively.

Under operation of the punching press machine, a desired one of punch tools 41a, 42a through 42d, 43a, mounted in the magazine is, in order, selected in accordance with tool selection commands 1 entered in machining programs. In detail, each of the tool selection commands comprises a holder designation code for designating any one of the plurality of tool holders and a tool designation code for designating any one of punch tools mounted in the designated tool holder. Each of the tool selection commands 1 is a T code having determined digits, for example, four digits. The holder designation code corresponds to determined digits namely upper two digits of the T code, and the tool designation code corresponds to determined digits namely lower two digits.

In more detail, a tool selection command "T1101" designating a first punch tool 42a in the multi-tool holder 42 consists of a holder designation code "11" for designating the multi-tool holder 42 and a tool designation code "01" for designating the first punch tool 42a. Further, tool selection commands for designating a second through fourth punch tools 42b to 42d in the multi-tool holder 42 are indicated with the codes of "T1102", "T1103", "T1104", respectively. Meanwhile, the ordinary holder equipped with only one punch tool is not required to designate a specific punch tool, therefore, a tool designation code related to the ordinary tool holder comprises a null code. For instance, tool selection commands "T10", "T12" for individually designating punch tools mounted in the tool holders 41 and 43 consist of only holder designation codes "10", "12" for designating the tool holders 41 and 43, respectively.

Moreover, under operation of the punching press machine, when one tool selection command 1 "T1101" is read from the machining programs by a control device of the punching press machine, the holder designation code "11" of the command is converted into an aimed rotational position of the magazine 4 by using a first angle parameter Pt, and further, the tool designation code "01" is converted into an aimed rotational position of the multi-tool holder 42 by using a second angle parameter Pc. And then, the magazine 4 is rotated around the T axis with a determined rotational angle and is positioned to the aimed rotational position, and further, the multi-tool holder 42 is rotated around the C axis with a determined rotational angle and is positioned to the aimed rotational position. Whereby, the first punch tool 42a of the multi-tool holder 42 is selected. Each of other punch tools mounted in the multi-tool holder 42 is also selected likewise. Furthermore, only positioning of the magazine 4 is executed to designate the ordinary holder, and the punch tool mounted in the holder is then selected.

Figure 2:
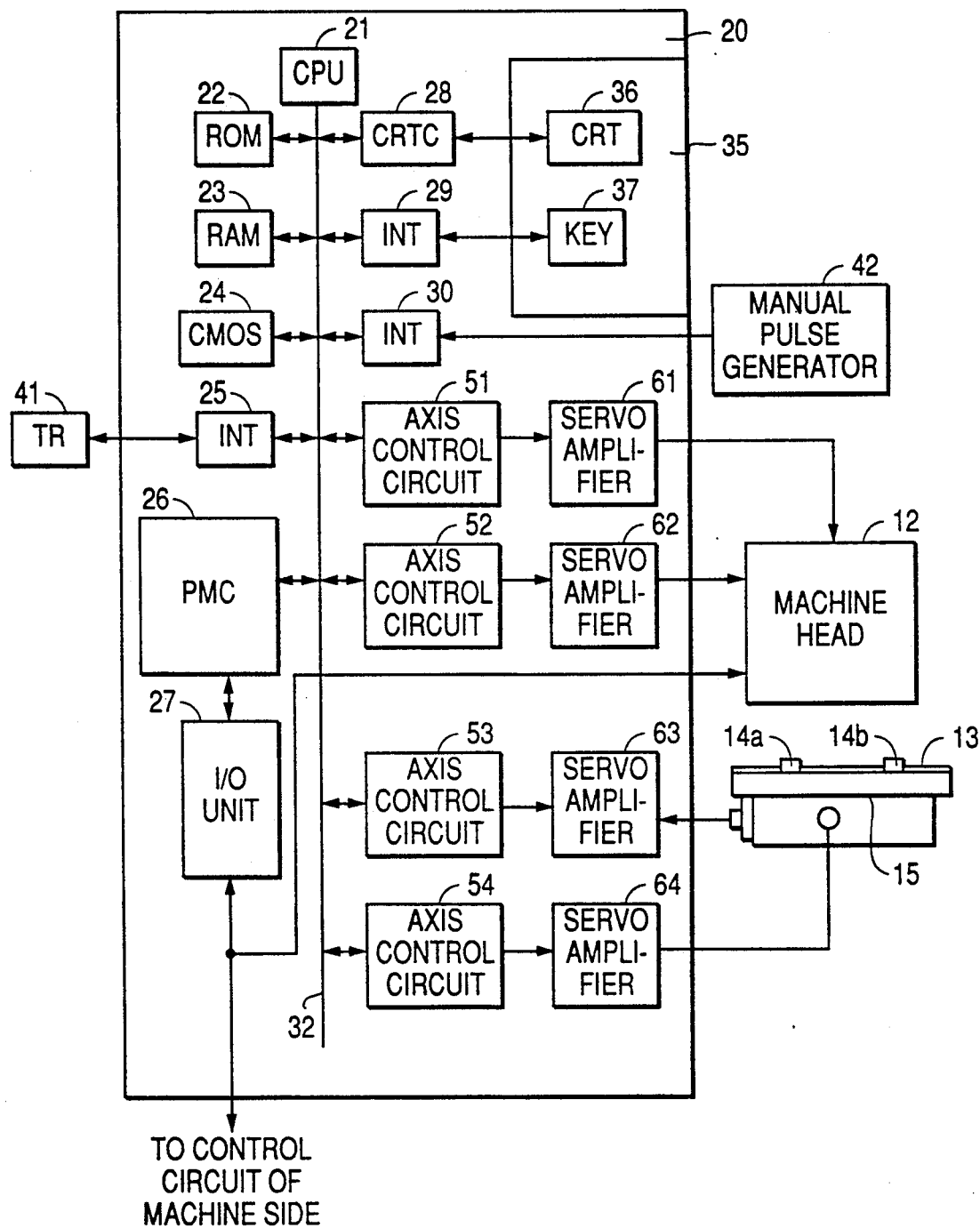
FIG. 2 is a schematic block diagram showing a punching press machine and control device thereof for carrying out the method of selecting a tool in FIG. 1.

The punching press machine and control device for carrying out the foresaid method of selecting tools will be, hereinafter, described with reference to FIG. 2.

The punching press machine provides various machine operating parts including a machine head 12 which has the magazine 4 (FIG. 1) and punch heads (not shown) and a table 15, various actuators including X-, Y-, T-, and C-axes servo motors (not shown) for driving these machine operating parts, a machine operation panel including a manual pulse generator 42 and as manual switch, and various sensors (not shown) such as a limit switch or the like arranged adjacent to an actuator. A position detector (not shown) for detecting a current rotational position of the motor is mounted to each servo motor. Further, the table 15 on which a workpiece 13 is fixed by work holders 14a and 14b is movably arranged in horizontal in X- and Y-axes direction.

A computer controlled type numerical control unit 20 which is used as the control device of the punching press machine provides a processor 21, a read-only memory 22 storing system programs, a static-random-access memory 23, a non-volatile memory 24 comprising a CMOS memory backed up by a battery, and an interface 25 connecting peripheral equipment 41 such as a paper tape reader, a paper tape puncher or the like. Machining programs read from the paper tape reader are stored in the memory 24, and machining programs edited in the control unit 20 are outputted to the paper tape puncher. Further, the memory 24 stores the first and second angle parameters Pt and Pc, tool correction, and pitch error correction, and the like.

When a move command for each axis is generated by the processor executing the machining programs, the move command is transmitted to servo amplifiers 61 to 64 through axis control circuits 51 to 54. Then, T-, C, X, and Y-axes servo motors are driven by the servo amplifiers 61 to 64 acting in accordance with the move command, respectively, and further, when indexing of the magazine 4 and the multi-tool holder 42 is carried out, the table 15 is horizontally moved.

Moreover, the numerical control unit 20 includes a programmable machine controller (PMC), which converts M, S, and T functions instructed by the machining programs into control output signals necessary to the punching press machine side according to sequence programs which are made into a ladder type. The control output signals from the PMC are applied to related actuators of the machine operating part through an input/output unit 27, and sequence operation of the machine operating part is controlled.

Under working of the punching press machine, digital data such as a current position of each axis, alarm, parameter, image data, or the like are converted into image signals by a graphic control circuit 28 and are transmitted to a display (CRT) 36 of a manual data input unit 35, and the image is then displayed on the CRT 36. The data which is inputted manually through a keyboard 37 of the data input unit 35 are read by the processor 21 through the interface 29.

Then, when the manual pulse generator 42 is operated so that the machine operating parts can be precisely positioned manually, a pulse from the manual pulse generator 42 is transmitted to an interface 30 of the numerical control unit 20.

Various modification can be made in the present invention without limiting to the above embodiment.

For example, although the upper and lower two digits of the T code (tool selection command) are used as the holder and tool designation codes, respectively, in the present embodiment, individual digit numbers of the holder and tool designation codes can be optionally determined in view of the total of tool holders mounted in the magazine 4, the total of punch tools mounted in the multi-tool holder, or the like.

Moreover, in the present embodiment, indexing of the magazine 4 and the multi-holder is carried out by T- and C-axes servo motors which are servo-controlled, utilizing contact type position detectors which are arranged at rotational positions of ordinary and determined motors, the rotational speed of the motor may be controlled by the programmable machine controller according to contact signals from the position detector.

What is claimed is:

1. A method of selecting a tool in a punching press machine which is provided with a plurality of tool holders including at least one multi-tool holder for a plurality of punch tools, comprising the steps of:
   (a) reading machining programs including tool selection commands each including at least a holder designation code for designating one of the plurality of tool holders and capable of including a tool designation code for designating one of the punch tools mounted in the one of the tool holders; and
   (b) indexing a magazine and the one of the tool holders in accordance with the holder and tool designation codes in each tool selection command every time one of the tool selection commands is read from the machining programs.

2. A method of selecting a tool according to claim 1, wherein said reading in step (a) of the tool designation code includes reading a null code when indexing of the tool holder is not required.

3. A method of selecting a tool according to claim 1, further comprising the step of (c) storing the holder designation code and tool designation code of each tool selection command using determined digits, respectively.

4. A method of selecting a tool according to claim 1, further comprising the step of (c) converting the holder and tool designation codes of each tool selection command into aimed rotational positions of the magazine and the one of the tool holders after said reading of each tool selection command in step (a) and before said indexing in step (b).

5. A method of selecting a tool according to claim 1, wherein said indexing in step (b) of the magazine and the one of the tool holders includes controlling rotation of a servo motor.

* * * * *